United States Patent
Kising

(12) 
(10) Patent No.: US 8,564,226 B2
(45) Date of Patent: Oct. 22, 2013

(54) METHOD AND SYSTEM FOR ULTRASOUND EXCITATION OF STRUCTURES WITH VARIOUS ARBITRARY GEOMETRY

(75) Inventor: Juergen Kising, Kreuzlingen (CH)

(73) Assignee: Artech Systems AG, Romanshorn (CH)

( * ) Notice: Subject to any disclaimer, the term of this patent is extended or adjusted under 35 U.S.C. 154(b) by 883 days.

(21) Appl. No.: 12/376,735

(22) PCT Filed: Aug. 10, 2007

(86) PCT No.: PCT/EP2007/007092
§ 371 (c)(1),
(2), (4) Date: Dec. 9, 2009

(87) PCT Pub. No.: WO2008/017494
PCT Pub. Date: Feb. 14, 2008

(65) Prior Publication Data
US 2010/0117564 A1 May 13, 2010

(30) Foreign Application Priority Data

Aug. 10, 2006 (DE) .......................... 10 2006 037 638
Oct. 5, 2006 (DE) .......................... 10 2006 047 591
Mar. 23, 2007 (DE) .......................... 10 2007 014 635

(51) Int. Cl.
*H02P 1/00* (2006.01)

(52) U.S. Cl.
USPC .......................................... 318/114; 310/311

(58) Field of Classification Search
USPC ................. 318/114; 310/311, 313 R
See application file for complete search history.

(56) References Cited

U.S. PATENT DOCUMENTS 5,032,753 A * 7/1991 Yamaguchi et al. .......... 310/317
5,665,141 A * 9/1997 Vago ................................. 95/30

(Continued)

FOREIGN PATENT DOCUMENTS

DE 4418175 A1 12/1994
EP 0567 551 A 11/1993

(Continued)

OTHER PUBLICATIONS

Serial No. PCT/EP2007/007092 filed Aug. 10, 2007, International Search Report and Written Opinion of the International Searching Authority, 16 pages (English translation); German International Search Report and Written Opinion of the International Searching Authority, 16 pages.

(Continued)

*Primary Examiner* — Rina Duda
(74) *Attorney, Agent, or Firm* — Andrew F. Young, Esq.; Lackenbach Siegel, LLP

(57) ABSTRACT

The invention is a method and apparatus for ultrasound excitation of structures of any geometry. The invention comprises production of a connection between a generator, an ultrasound converter, and at least one mechanical system to be excited, passing through a frequency range for determining an operating point, wherein at each approached frequency the power consumption of the system to be excited determines a current, and/or a voltage emitted by the generator, which is measured using a sensor such that a measurement value of the sensor renders the power output to the system to be excited, and performing an ultrasound excitation at the determined operating point or its immediate surroundings. The device further comprises a memory for storing target values for the power supplied to the total system input, and of parameter values for voltage, current, and frequency, in which the desired target values or ranges are achieved.

20 Claims, 5 Drawing Sheets

(56) References Cited

U.S. PATENT DOCUMENTS

| | | | |
|---|---|---|---|
| 6,242,847 B1 * | 6/2001 | Puskas | 310/325 |
| 2002/0060230 A1 | 5/2002 | Zysset et al. | |

FOREIGN PATENT DOCUMENTS

| | | |
|---|---|---|
| EP | 2049 274 | 8/2007 |
| JP | 1090071 | 4/1989 |
| JP | H 08500058 | 1/1996 |
| JP | 2002204964 | 7/2002 |
| JP | 2003066678 | 3/2003 |
| WO | WO 92/12807 | 8/1992 |

OTHER PUBLICATIONS

JP 2009-523303 Notification of Reasons for Rejection drafted Jul. 19, 2012, 7 pages—English.

* cited by examiner

METHOD AND SYSTEM FOR ULTRASOUND EXCITATION OF STRUCTURES WITH VARIOUS ARBITRARY GEOMETRY

RELATED APPLICATIONS

This application is related to, and claims priority from, three (3) German Patent applications: (1) Application No. DE 10 2006 037638.2, filed Aug. 10, 2006; (2) Application No. DE 10 2006 047591.7, filed Oct. 5, 2006; and, (3) Application No. DE 10 2007 014635.5, filed Mar. 23, 2007; all three incorporated into, and later filed as, Patent Cooperation Treaty (PCT) Application No. PCT/EP 2007/007092 filed Aug. 10, 2007. The entire contents of each of the above is incorporated herein by reference.

BACKGROUND OF THE INVENTION

1. Field of the Invention

The present invention relates to a method and system for ultrasound excitation of structures so as to reduce friction for ease of movement. More specifically, the present invention relates to the field of materials handling where performance can be increased considerably by ultrasound excitation of screening materials, the reduction of friction between bulk goods and their respective containers, or to a reduction of the mechanical resistance between materials which can thus reduce the wear and the energy input, respectively, in mechanical motion processes.

2. Description of the Related Art

The industry has a number of uses for which it is desirable to reduce the friction between the particles and/or between the particles and a system, which is in contact therewith. Some examples for such uses are:

The ultrasound screening, where the performance can be increased considerably by ultrasound excitation of the screening material. The performance in response to the ultrasound screening is a function of the clogging tendency of the screening materials. The material openings are kept free by means of the use of ultrasound because the static friction is transferred into the smaller dynamic friction due to the ultrasound motion and because powder bridges are broken.

The transport of bulk goods and colored powder in tubes or on platforms. The friction between the bulk goods and the platform or the conduit reduced by the ultrasound excitation is reduced. The volume flow rate can thus be metered better and the performance can be increased.

The excitation of interfaces between moving particles or between fixed and moved surfaces. Generally, the transition from the static friction to the dynamic friction caused by the use of ultrasound leads to a reduction of the mechanical resistance and can thus reduce the wear and the energy input, respectively, in mechanical motion processes.

According to the state of the art, it was normal until now to adapt the natural vibration frequency of the mechanical body, which is to be made to vibrate, to the converter frequency for the purpose of ultrasound excitation. Such a screening system can be found in DE 4418175, for example.

However, when using this approach, it is problematic that the tuning of the mechanical body, which is to be made to vibrate, to the converter frequency is difficult and is connected with much effort. Already common manufacturing tolerances, in particular at welding or other connecting points, or fluctuations of the acoustic parameters, such as e-module, speed of sound and density, lead to mechanical bodies with slightly different natural frequencies, which already differ from one another to the extent that the operation of a plurality of screens, for example, is impossible with an ultrasound converter according to the state of the art.

Upon transitioning to more complex mechanical bodies, the individual resonances thereof are no longer clearly developed, for the most part, and one attains a mountain of resonances, as is shown below. This vibration behavior generally does not oppose a performance-boosting ultrasound excitation. It is known from EP 0 567 551 B1, for example, to excite the frames of screening systems to a vibration outside of the resonance frequency.

If, nonetheless, problems oftentimes arise in response to the operation of ultrasound-excited systems, which are not tuned to the frequency of the ultrasound converter, this is the result of the presently used ultrasound generator technology, where the phase angle is used for controlling the generator.

This control principle works better, and the more clearly the zero crossing can be determined in response to the change of sign of the phase, that is, in particular with high-quality resonance systems, which, in turn, can be achieved only with exactly tuned resonators without high attenuation effect.

Vice versa, resonances, which do not identify a clear zero crossing of the phase, are not recognized and the control fails. If the quality or the phase information deteriorates during the operation, the phase control can fail completely and the generator goes into overload.

While a use of the phase control is indeed advantageous in very high-quality systems, as must be used in response to ultrasound welding, e.g., this approach becomes susceptible and instable when the quality of the vibrating system is not sufficient. Accordingly, it must thus be ensured that this is the case by means of extensive individual adaptation of the vibrating system to the desired resonance frequency.

A further problem in response to a resonance excitation is that the resulting resonance amplitude is determined so as not being capable of being controlled, particularly in complex resonance systems. This is problematic because this variable determines the power loss, which in turn leads to the heating of the system. An uncontrolled heating as such is already disadvantageous in many cases, because a sintering of the powder, or of the bulk goods, is boosted. This problem increases in response to materials which already become soft or start to melt at low temperatures.

Furthermore, the quality of the excited system is a function of the temperature. It is thus possible, in response to resonance excitation for the heating of the system, to improve the quality, which, in turn, leads to a higher resonance amplitude and thus to a further heating, which further improves the quality.

Based on this state of affairs, the problem of providing a method and a system for ultrasound excitation arises, with which the excitation of arbitrarily complex structures and, in particular, also of a plurality of screens, are made possible in response to the lowest possible heating.

Accordingly, there is a need for an improved system and method for ultrasound excitation comprising the features of a connection between a generator, an ultrasound converter, and at least one mechanical system to be excited, and passing through a frequency range for determining an operating point. At each approached frequency, the power consumption of the system to be excited determines a current, and/or a voltage emitted by the generator, which is measured using a sensor such that a measurement value of the sensor renders the power output to the system to be excited, and performing an ultrasound excitation at the determined operating point or its immediate surroundings. The device further comprises a memory for storing target values for the power supplied to the total system input, and of parameter values for voltage, current, and frequency, in which the desired target values or ranges are achieved.

OBJECTS AND SUMMARY OF THE INVENTION

The invention is based on the knowledge that it is advantageous to adapt vibration frequencies and amplitudes of the ultrasound converter by means of the generator control to the vibration behavior of the total system instead of attempting to adapt the vibration behavior of resonating sound conductors to a natural frequency of the ultrasound converter.

According to the method as claimed in the invention, after a first step of producing the connection between generator, ultrasound converter, and the subsystems which are to be excited by means of the ultrasound, the operating point of the system is accordingly searched and established in a second step by varying the (generator) parameter frequency of the generator via a specific range and by measuring the current and/or the voltage, which is determined by the power consumption at the current frequency value. The ultrasound excitation then takes place in a third method step at the operating point or in its environment, wherein the operating point, once determined, or the environment, once determined, is not controlled anymore, but the frequency can be varied within the determined environment of the operating point.

Even in the event that it is a fixed excitation at an operating point, this will typically not be a resonance excitation of a sound conductor belonging to the screening system, but an excitation of the dispersion amplitude. The excited sound conductor or screening frame thus transfers the vibration generated by means of the ultrasound converter to the screening frame or sound conductor, which is not directly excited by the ultrasound converter, by means of connecting elements. Neither the screening frame nor the sound conductor are thereby tuned; even the provision of supply resonators tuned to the ultrasound converter is no longer necessary, but they are replaced by simple supply pieces or supply sound conductors. The form of excitation thereby corresponds to the forced vibration of a harmonic oscillator comprising a force amplitude $F_0$. The general solution of the corresponding differential equation for a system comprising mass M, natural frequency $\omega_0$ and attenuation constant $\Gamma$ has the design:

$$X(t) = A \sin(\omega t) + B \cos(\omega t)$$

wherein the dispersion amplitude B can be represented as:

$$B = \frac{F_0(\omega_0^2 - \omega^2)}{M(\omega_0^2 - \omega^2)^2 + \Gamma^2 \omega^2}$$

and for the ratio between dispersion amplitude B and absorptive amplitude A the following applies:

$$\frac{B}{A} = \frac{\omega_0^2 - \omega^2}{\Gamma \omega}$$

For large frequency distances between natural frequency of the system and excitation frequency, the absorptive amplitude A becomes negligible and the following applies in a good approximation:

$$B = \frac{F_0}{M(\omega_0^2 - \omega^2)}$$

It thus becomes clear that the parameter excitation amplitude, which is highly relevant for the efficiency of the screening process, is proportional to the force amplitude $F_0$ in response to the excitation of a dispersion vibration and that it can thus be controlled in a highly systematic manner. However, this is not only the case across a specific range of the screen, because, due to the fact that a dispersion vibration of the system is excited, the corresponding components must no longer fulfill a resonance condition, which enables an optimization of the component geometry in view of the distribution of the sound amplitude via the screening material.

A frequency range from 33 to 37 kHz have notably proven themselves as parameters defining the search range in response to currents between 0 and 0.5 A and voltages between 0 and 600 V, wherein the preferred step size is 500 μsec.

Advantageously, the power (power loss), which correlates with the vibration amplitude of the excited system, which is supplied to the total system, which is a function of square of the vibration amplitude and of the contact surface is used as criterion for selecting the operating point. This context shows that it is not only important to maximize the amplitude of a single sound conductor, for instance by operating in its resonance, but that it is furthermore substantial to excite a large contact surface. The power supplied to the total system can be relevant in response to a single fixed frequency, but it often also proves to be advantageous to consider the power supplied to the system in response to a variation of the excitation frequency across the chosen environment of the operating point. Due to the fact that an excitation typically takes place by means of a dispersion amplitude, no problems are associated with local heating and, contrary to the situation in response to the resonance operation of a sound conductor, the thermal effects on the material to be moved or screened, can be controlled.

A preferred embodiment provides for the use of the operating point with the highest power supplied to the total system at a fixed frequency or via a frequency range. In this case, the current value of the power supplied to the total system is in each case determined in response to passing through the generator parameters of the search range, is compared to the stored currently highest value and is then stored together with the generator parameters leading to its attainability when the value is higher than the currently highest value.

However, a user-defined specification of another target value, which is to come as close as possible to the power supplied to the total system, which can be advantageous, in particular if the system is to operate with temperature-sensitive materials, is also possible.

In this case, the target value is deducted from the power supplied to the total system in response to passing through the frequency range prior to the comparison with the presently best value and the value is then stored together with the generator parameters, with which it is achieved, as a new best value when the difference between target value and the value determined for the given generator parameter set is less than the currently best value.

In an embodiment of the method, which is particularly preferred because of its high efficiency, a plurality of structures to be excited, are excited at the same time by means of a single generator and by means of a single or a plurality of ultrasound converters. According to the state of the art, this is typically not possible because manufacturing variations and variations of the acoustic parameters of the mechanical bodies to be excited, are sufficient for shifting the resonance frequencies thereof against one another, which, in turn, leads to a phase behavior of the total system, which leads to a malfunction of generators comprising phase control.

In a further advantageous development of this process, which can be of interest in particular when grave differences arise with reference to the efficiency of the excitation in response to the common excitation of a plurality of structures to be excited, the operating frequency is varied during operation in a certain range around the operating point. This approach can lead to a compensation of the efficiencies.

When defining the range of the frequency variation, different approaches are possible. In the simplest embodiment of the method, a frequency interval, for example +/−1000 Hz, which is then placed around the located operating point, is simply determined by the user.

The definition of the range of the frequency variation using threshold values, which are based on a certain power drainage and on a certain current, respectively, and/or on a certain voltage relative to a maximum power output, respectively, and on a certain current and/or a certain voltage, e.g. 50% of the maximum values of these variables, is more extensive. The frequency values are thereby established as boundaries of the variation range, at which the threshold values are undercut. In this embodiment, the supplied power is advantageously optimized by means of the delivery to the power spectrum; in screening systems comprising clearly defined resonances, a variation range, which is smaller than in screening systems comprising very flat resonances, will be available around the operating point. Another possibility for automatically defining the boundaries of the frequency variation is to automatically find the lowest and the highest frequency position, at which a predetermined value of the power supply and of the voltage or of the current, respectively, are reached and to then use these positions as boundary for the range variation. This is particularly advantageous when a high power consumption takes place in a plurality of ranges in the vibration spectrum.

In another embodiment of the method, which, for its executions, requires means for graphically illustrating the dependency between power consumption of the system and current respectively, and/or voltage values and excitation frequency determined by the generator, this dependency is illustrated graphically and the boundaries of the variation range are manually defined by the user. In this approach, screens comprising frequency groups located apart from one another can be controlled in an optimized manner. A used automated method is also possible in that a frequency range chosen once is controlled, e.g. by comparing the integrals via the variable determined by means of the generator across the total examined frequency range and the frequency range comprising the boundaries, which were just chosen. If the latter falls below a certain fraction of the former, this is a sign that ranges, which are significant for the increase of the performance, are not yet covered by the frequency variations.

For high stability of the performance of the method it is advantageous to operate the generator below its capacity.

It has proven itself to be sensible to reduce the power supply of the generator during the search for the operating point so that the generator provides less power during the search for the operating point than in response to the subsequent operation at this operating point. Damages to the system, when a high-quality resonance is hit, are thus avoided.

As is the case with a conventional system for excitation by means of ultrasound, the device according to the invention encompasses a generator, an ultrasound converter and at least one mechanical structure to be exited. The generator encompasses means for varying the excitation frequency via a frequency range between 33 and 37 kHz as well as the provision of currents between 0 and 0.5 A and voltages between 0 and 600 V. Furthermore, provision is made according to the invention for at least one sensor for measuring the voltage and current values occurring in response to a given excitation frequency, from the measuring data of which the power supplied to the total system is determined.

Furthermore, the system according to the invention comprises a memory, in which, on the one hand, desired values for the power loss, which can be input by a user, can be stored and in which, on the other hand, parameter values, for which the desired values are reached or reached as closely as possible, can be stored. In particular, the memory can also be dimensioned in such a manner that the measuring values determined by the generator when passing through its total frequency range are stored as a function of the frequency at the respective measuring point. It is also possible, however, to transfer these data to a PC and to store them there.

The use of an ultrasound converter, which is designed for large amplitudes for compensating for the omission of the build-up of the resonance amplitude, which is typical for the operation in resonance frequency of the ultrasound converter, is thus necessary. A typical amplitude of 6 μm peak-peak has turned out here to be sufficient for many uses.

In a particularly advantageous embodiment, the ultrasound converter is thereby arranged outside of the powder flow.

It is also useful to provide for a supply sound conductor, which is arranged between the ultrasound converter and the directly excited sound conductor or screening frame. This supply sound conductor can be designed as a linear or curved line rod and can either be designed for exciting flexural or longitudinal vibrations.

With a corresponding embodiment of the supply sound conductor it is possible, in particular, to optimize the excitation amplitude in view of the used screening and sound conductor geometry as well as the used types of powder.

In particular, with expanded sound conductors, it can furthermore be useful to excite the sound conductor at more than one location and to thus use a plurality of supply sound conductors for compensating for attenuation, which may be too large. Such an arrangement can also be operated when using only one ultrasound generator either in parallel, that is, with a simultaneous excitation via both sound conductors, or sequentially, that is, alternately. The last-mentioned solution is particularly cost-efficient, but reduces the performance. However, in addition to a more homogenous vibration amplitude, the use of a second ultrasound generator for exciting the second supply sound conductor, also has the advantage that the frequencies are not typically tuned exactly and that they are not identical but typically differ from one another by several 100 Hz. This leads to a low-frequency beat, which has an advantageous effect on the discharge behavior for certain types of powder.

In an advantageous embodiment, the sound conductor is molded so as to be L-shaped or as a square pipe, because this shape encompasses a high stiffness as compared to forces acting at right angles and because the short blade of the L or of the square pipe can serve as contact or adhesion surface to the screening material.

Another arrangement provides for a plurality of sound conductors to be arranged on the screening material. Said sound conductors are in contact with a first sound conductor, which is excited. In so doing, it is possible to achieve very homogenous distributions of the sound on very large screens in an advantageous manner.

Ring-shaped sound conductors, angled sound conductors and sound conductors in the shape of a segment of a circle represent yet other advantageous sound conductor geometries.

A further advantageous embodiment for the optimized distribution of the sound energy across the screening surface is to weld resonator plates to the sound conductor, via which the contact to the screening surface is then provided. Plate-shaped resonators comprising a diameter of from 40-60 mm and a thickness of approx. 1.5 mm, represent a preferred embodiment. However, rectangular or square resonators can also be used.

A particularly preferred embodiment provides for providing individual amplitude modulators or consecutive amplitude modulators connected in series at least partially as acoustical bridges between different sound conductors and/or as connecting piece to the screening frame. Rods, which encompass sections comprising a different radius can be used, for example, as amplitude modulators, wherein the length can be tuned to selectable frequencies, whereby a local modification of the vibration amplitude in certain frequency ranges is achieved selectively in individual sound conductors of the system. Likewise, it is possible to provide sections comprising rectangular cross sections, which encompass an improved stiffness. They are preferably used in screens, which require a high degree of stiffness for supporting the bearing weight of the powder. With these amplitude modulators, crossbars can also be installed within the sound conductor for counteracting the pressure of the screening product. The manufacturer can thus forego an additional mechanical bearing cross within the screening surface, for example.

The above, and other objects, features and advantages of the present invention will become apparent from the following description read in conduction with the accompanying drawings, in which like reference numerals designate the same elements.

DETAILED DESCRIPTION OF THE PREFERRED EMBODIMENTS

Figure 1:
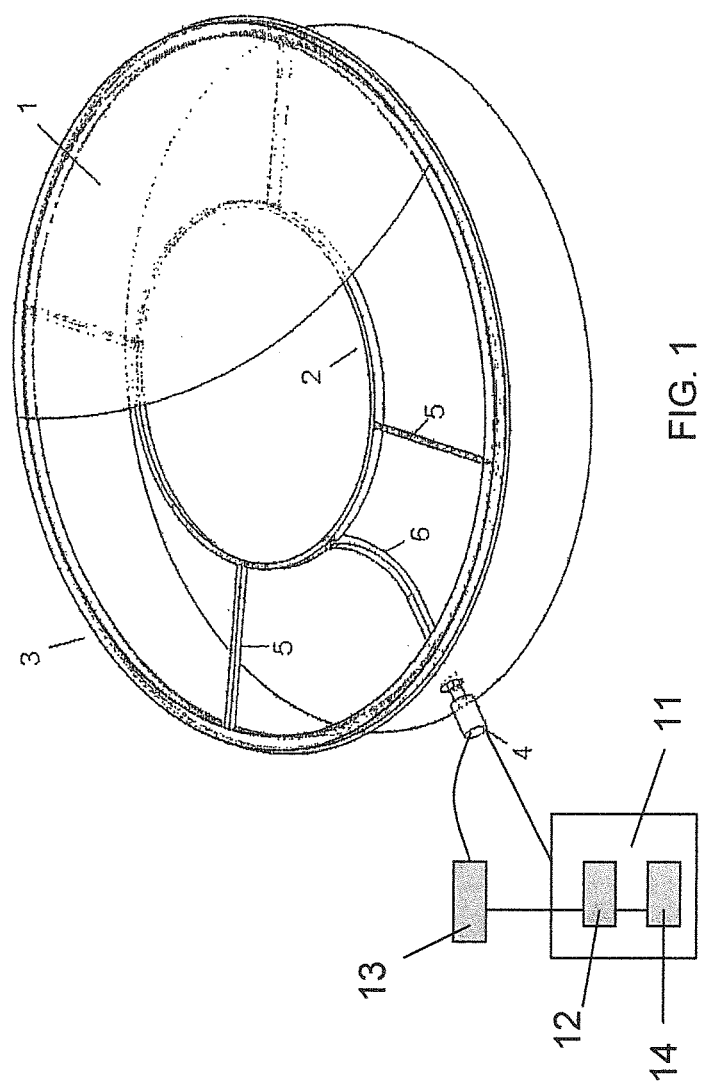
FIG. 1 shows a screening arrangement comprising a circular sound conductor structure and curved supply sound conductor.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

The course of action in response to the ultrasound screening is initially defined by means of FIG. 1 by means of an exemplary device. The sound conductor 2 is in close contact with the screening material 1, which is fastened to the screening frame 3. A supply sound conductor 6 is set into vibration by means of a ultrasound converter 4, which is operated at a given vibration frequency by means of a non-illustrated generator. The supply sound conductor 6 is embodied as being curved in the illustrated exemplary embodiment, but can also be embodied so as to be linear, for example. The supply sound conductor 6 excites the sound conductor 2, which is connected to the screening frame 3 by means of the connecting element 5. In this arrangement, it is not only possible to arrange the converter outside of the powder flow, but the vibrations excited in the sound conductor 2 are also transmitted to the screening frame by means of the connecting element 5. In the alternative, the screening frame 3 can also be excited via the supply sound conductor 6 and vibrations can be transmitted to the sound conductor 2 by means of the connecting elements 5.

Generator 11 encompasses control means 12 for varying the excitation frequency via a frequency range between 33 and 37 kHz as well as the provision of currents between 0 and 0.5 A and voltages between 0 and 600 V. Furthermore, provision is made according to the invention for at least one sensor 13 for measuring the voltage and current values occurring in response to a given excitation frequency, from the measuring data of which the power supplied to the total system is determined.

Generator 11 comprises a memory 14, in which, on the one hand, desired values for the power loss, which can be input by a user, can be stored and in which, on the other hand, parameter values, for which the desired values are reached or reached as closely as possible, can be stored. In particular, the memory can also be dimensioned in such a manner that the measuring values determined by the generator when passing through its total frequency range are stored as a function of the frequency at the respective measuring point. It is also possible, however, to transfer these data to a PC and to store them there.

Figure 2:
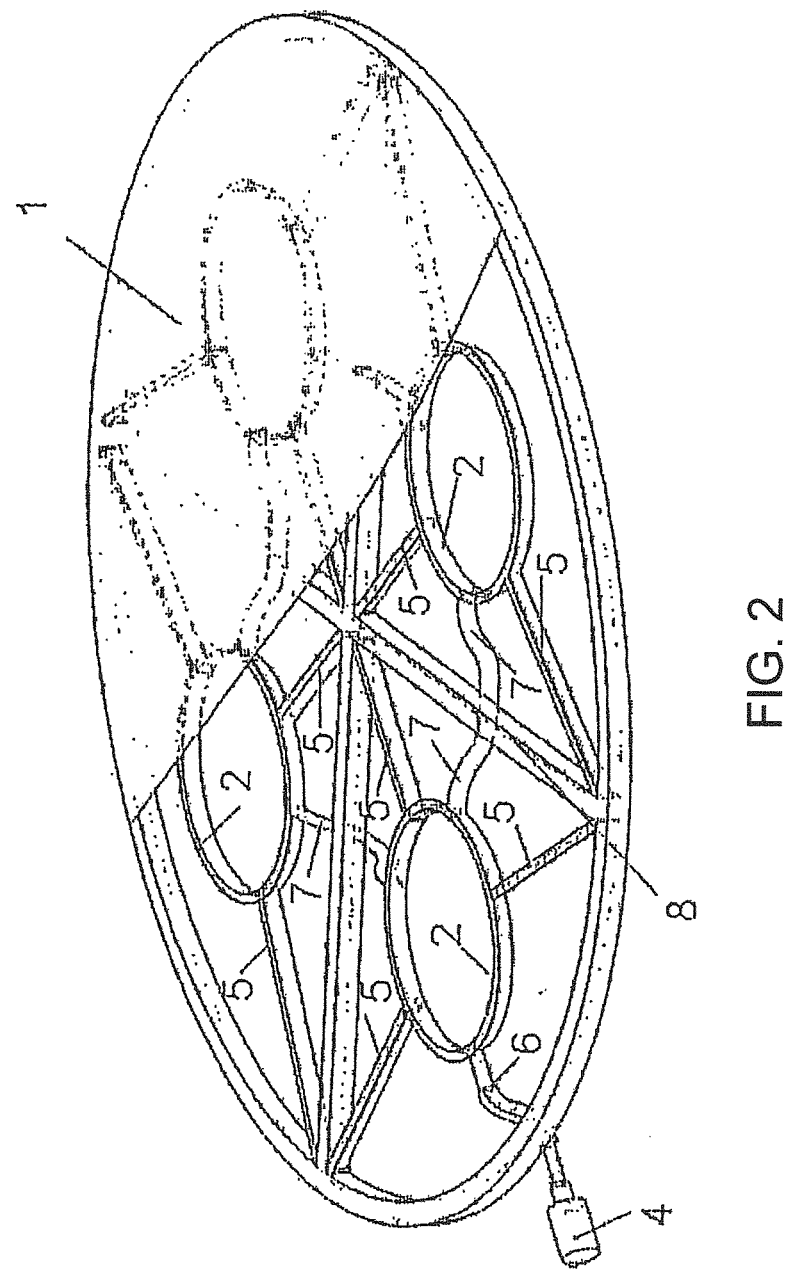
FIG. 2 shows a screening arrangement comprising a complex sound conductor structure.

In both cases, a more even distribution of the sound on the screening material is thus achieved. This can be further optimized because the excited system contrary to the situation with known screening systems, comprising sound conductors tuned to a resonance of the ultrasound converter, is operated so as not to be tuned to a resonance frequency, but the frequency operating point is adapted to the conditions of the system, whereby the flexibility is considerably increased with reference to the shape and size in response to the embodiment of the different frame/sound conductors. FIG. 2 shows an example for such an improved arrangement, the analogon of which for the resonant operation would not be possible or would only be possible with considerable effort with the incorporation of four resonators, which are tuned to identical frequencies. Four ring-shaped sound conductor structures 2, which are connected to one another via acoustical bridges 7, are connected to the screening frame 3 and a bearing cross 8, respectively, via connecting elements 5. One of the sound conductor structures 2 is excited by means of an ultrasound converter 4. The vibration is transferred via the acoustical bridges 7 to the other sound conductors 4 and to screening frames and support cross via the connecting elements 5. In particular, the operation of angled sound conductor structures also becomes possible.

Figure 3:
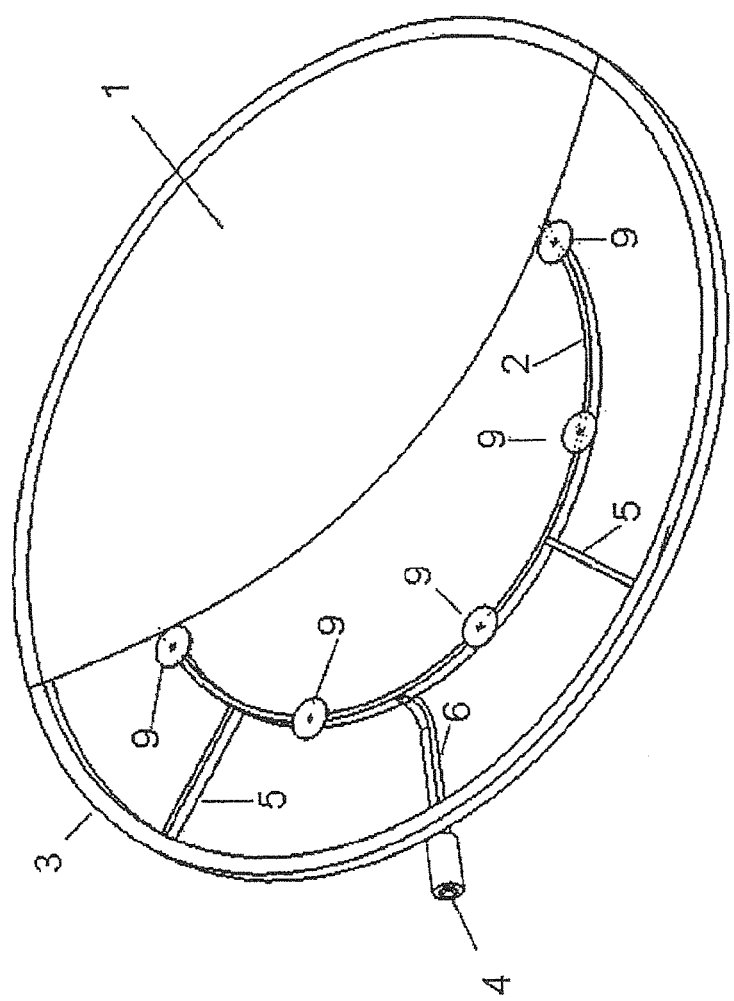
FIG. 3 shows a screening arrangement, in which plate-shaped resonators are additionally arranged between sound conductor and screening surface.

FIG. 3 introduces an embodiment, in which a plurality of resonator plates 9 are mounted between sound conductor 2 and screening material 1. Their typical number lies between 6 and 10, but a different number of resonator plates 9 can also be advantageous, depending on the screening and sound conductor geometry. The use of this measure achieves an additional homogenization of the transmission of the sound energy to the screening material.

Figure 4:
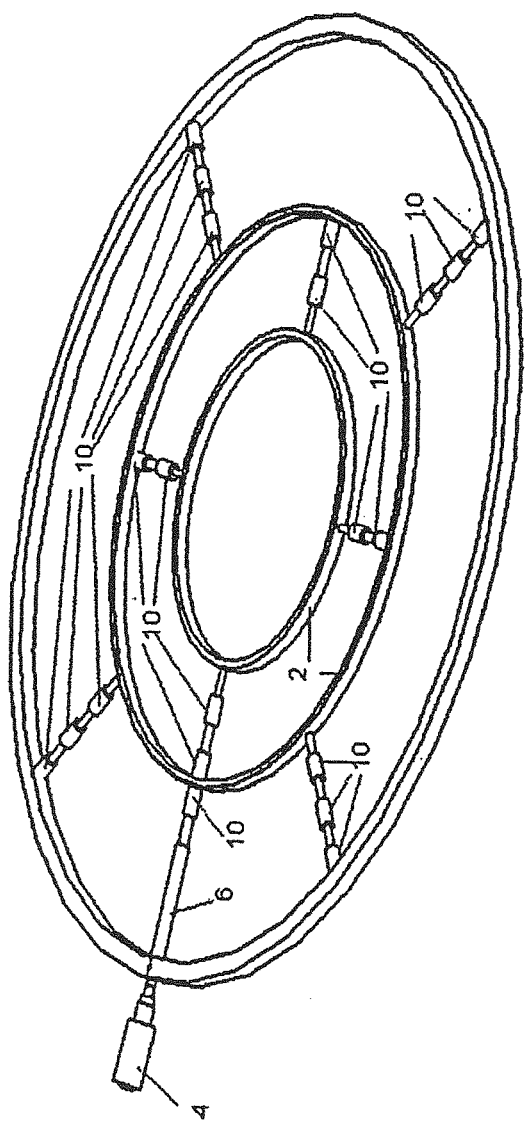
FIG. 4 shows a screening device comprising two ring-shaped sound conductors, which are connected to one another and to the frame in each case via different strings of amplitude modulators.

The arrangement illustrated in FIG. 4 points out advantages, which are involved with the embodiment of acoustical bridges 5 and/or connecting elements 7 in the form of amplitude modulators 10. A screening device, in which different series connections of amplitude modulators 10 are used, can be seen in FIG. 4. Initially, an outer circular sound conductor 2, which is connected to an inner circular sound conductor 2 via two amplitude modulators 10 and which is connected to the frame via three amplitude modulators 10, which are arranged in reverse direction, is excited via a supply sound conductor 6.

Figure 5:
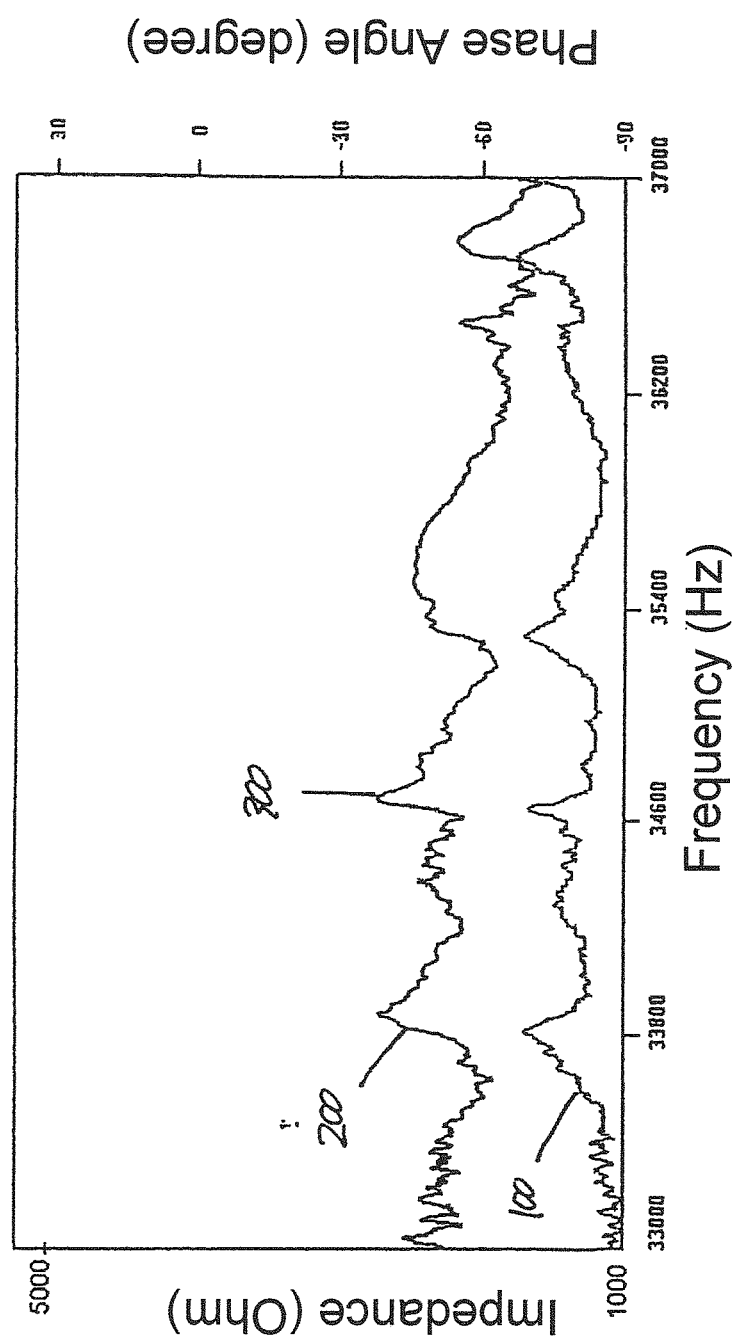
FIG. 5 shows a result of a frequency analysis of a coupled system.

The phase angle curve 100 shown on the bottom of FIG. 5, shows a measurement of a phase angle as a function of an excitation frequency for an excited coupled mechanical system. According to the method for the excitation of vibrations known from the state of the art, a stable zero crossing of the phase angle in this curve would have to be identified so as to be able to perform the desired excitation in a natural frequency. A view onto the curve 100 shows the person of skill in the art that an excitation of the systems based on this control system is not possible.

The method according to the invention bypasses this problem by using another control criterion. To select the operating point, at which operation is to be carried out, the frequency is gradually varied between 33 kHz and 37 kHz. The total power received by the system thus leads to a current and/or a voltage of the generator for each frequency, which is chosen in such a manner. The value of this current and/or of this voltage measured by means of a sensor is used for determining the power supply at this frequency to the system to be excited, as power loss.

An approach for this can be that the voltage is initially held constant for all frequencies, while the current rises or falls with the power consumption of the system. However, it is also possible to change the voltage in response to constant current.

In so doing, the impedance curve 200 shown in FIG. 1, which is correlated with the power loss supplied to the total system, can be determined as a function of the excitation frequency. The fact that the preferred operating point is that point, where the highest output power loss occurs, is used in the embodiment of the invention described herein, as criterion for selecting the operating point, at which the generator is then operated. This point 300 can be easily determined with the complex excited system. However, other selection criteria are also possible, which can be a function of the attainable integral power across a certain frequency range, for example.

The operation of the ultrasound-excited system then takes place at the operating point determined in such a manner. Advantageously, the frequency is continuously passed through (swept) around the steadied operating point in response to the excitation of a plurality of structures.

LIST OF REFERENCE NUMERALS 1 screening material
2 sound conductor
3 screening frame
4 ultrasound converter
5 connecting element
6 supply sound conductor
7 acoustical bridge
8 bearing cross
9 resonator plate
10 amplitude modulator
100 phase angle curve
200 impedance curve
300 operating point In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A Method for an ultrasound excitation of structures of any given geometry, comprising the steps of:
   (a) producing a connection between a generator, a sensor, an ultrasound converter, and at least one mechanical system to be excited;
   (b) running through a frequency range to determine a working point, wherein at each frequency level of said frequency range a power uptake of said system being excited, measured by said sensor, determines a current and/or a voltage put out by said generator, so that a measured value as determined by the sensor reflects a power level put out to said system being excited; and
   (c) performing an ultrasound excitation at said determined working point or in a close proximity to said determined working point, wherein said determined working point once established or said proximity once selected is no longer changed.

2. The method of claim 1, wherein said power given off to said system is a criterion for determining said working point.

3. The method of claim 1, wherein said working point is the point at which the highest power given off to said system being excited is attained.

4. The method of claim 3, comprising the further step of running through said frequency range each time a current value is determined for said power given off to said system being excited, compared to the highest value thus far saved in a memory of said system, and then saved along with said voltage and/or said current and said frequency values bringing about its attainment.

5. The method of claim 1, wherein said working point is the point at which a value is attained for said power given off to said system being excited that comes closest to a predetermined nominal value.

6. The method of claim 1, wherein a plurality of mechanical systems are excited essentially simultaneously.

7. The method of claim 1, wherein said frequency of said generator is varied by a given range about said established working point.

8. The method of claim 7, comprising the further step of establishing said range of said frequency variation by using a set of threshold values which are referred to a particular power output or a particular current and/or a particular voltage relative to a maximum power uptake or a particular current and/or a particular voltage, in that said frequency values closest to said working point are set as lower limits of said frequency range for said threshold values, or in that the lowest and the highest frequency position at which a predetermined value of said power output or said voltage or said current is attained are set as lower limits of said threshold values.

9. The method of claim 7, wherein the dependency between said power uptake of said system or said current and/or said voltage values and said excitation frequency, as determined by said generator, is graphically plotted and the limits of a range of variation are defined manually by a system user.

10. The method of claim 1, wherein said generator is operated below its rated power during said ultrasound excitation.

11. The method of claim 1, wherein during said running through said of said frequency range, said generator is operated at a lower power output at each of said frequency levels.

12. A method for an ultrasound excitation of structures of any given geometry, comprising the steps of:
producing a connection between a generator, an ultrasound converter, and at least one mechanical system to be excited;
running through a frequency range to determine a working point, wherein at each frequency level of said frequency range a power uptake of said system being excited determines a current and/or a voltage put out by said generator, so that a measured value as determined by a sensor reflects a power level put out to said system being excited; and
performing an ultrasound excitation at said determined working point or in a close proximity to said determined working point, wherein said determined working point once established or said proximity once selected is no longer changed;
wherein said working point is the point at which the highest power given off to said system being excited is attained;
running through said frequency range;
subtracting a predetermined nominal value from said power given off to said system being excited; and
saving a resulting value, along with said voltage and/or said current and said frequency value at which it is attained, if the value obtained by the subtraction is smaller than a best value previously saved.

13. A system for ultrasound excitation of structures of any given geometry, comprising:
(a) a generator, said generator having a control means for establishing a value for each of voltage, current, and frequency, by which each of said values can be varied over a certain range;
(b) at least one ultrasound converter;
(c) at least one mechanical structure;
(d) at least one sensor for determining a voltage reflecting the power given off to said mechanical structure and/or a current reflecting the power given off to said mechanical structure at a given frequency; and
(e) a memory for saving:
(i) a set of specified nominal values for the power given off to said system as entered by a system user; and
(ii) a set of parameter values for voltage, current and frequency
wherein said generator provides a range of excitation frequency to said mechanical structure and records the power given off at each of the excitation frequency, and determines a working point by selecting the excitation frequency that causes the highest power given off.

14. A system, according to claim 13, wherein at least one supply sound conductor is arranged between said ultrasound converter and a sound conductor or a screen frame.

15. A system, according to claim 14, wherein said arrangement of said at least one supply sound conductor is suitable for excitation of a set of flexural oscillations or for excitation of a set of longitudinal oscillations.

16. A system, according to claim 15, wherein said at least one supply sound conductor is suitable for scaling the amplitude of excitation.

17. A system, according to claim 16, comprising a plurality of said supply sound conductor.

18. A system, according to claim 14, comprising a plurality of said sound conductors communicating with each other in a sound conducting manner, and wherein only one of said sound conductors is providing said excitation.

19. A system, according to claim 14, wherein a plurality of resonator plates are firmly arranged on said sound conductor between said screen surface and said sound conductor.

20. A system for ultrasound excitation of structures of any given geometry, comprising:
(a) a generator, said generator having control means for establishing a value for each of voltage, current, and frequency, by which each of said values can be varied over a certain range;
(b) at least one ultrasound converter;
(c) at least one mechanical structure;
(d) at least one sensor for determining a voltage reflecting the power given off to said system and/or a current reflecting the power given off to said system at a given frequency; and
(e) a memory for saving:
(iii) a set of nominal values for the power given off to said system as entered by a system user; and
(iv) a set of parameter values for voltage, current and frequency;
wherein at least one supply sound conductor is arranged between said ultrasound converter and a sound conductor or a screen frame;
(f) a circular screen frame, which is subdivided by a support cross into a first set comprising a plurality of partial segments, said plurality of partial segments further comprising:
a circular sound conductor in each of said partial segments, one of said circular sound conductors being directly excited, and each of said sound conductors is connected to a second set of sound conductors, wherein each of said sound conductors comprising said second set is arranged in neighboring partial segments via a set of sound bridges, and each sound conductor is joined by means of connector elements to said support cross and to said screen frame.

* * * * *